9855X
P. White.
Making Ship Thimbles.
Patented Jul. 1, 1836.
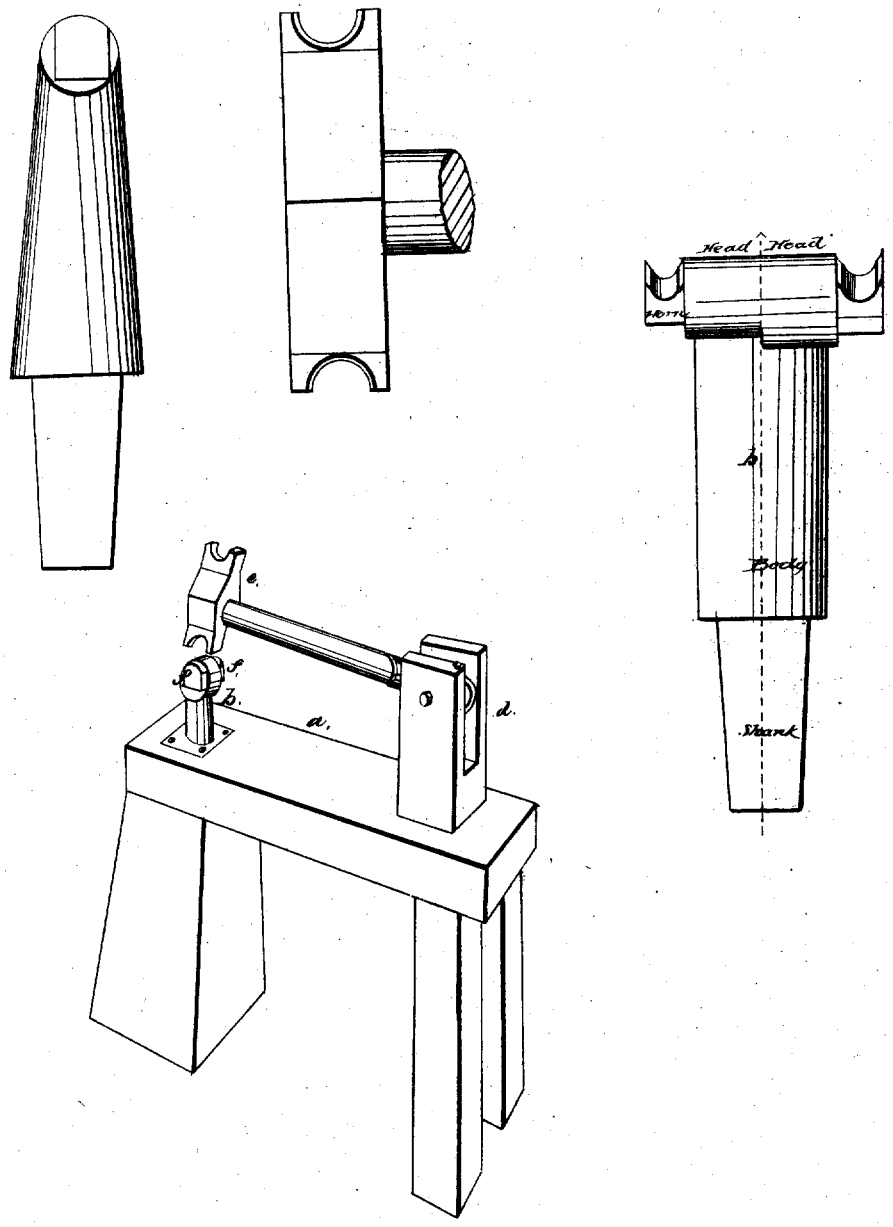
THE NORRIS PETERS CO., PHOTO-LITHO., WASHINGTON, D. C.

554 July 1st. 1836 a. 12

Prentiss White of Yarmouth. Massachusetts.

Letters Patent.

The schedule referred to in these Letters Patent and making part
of the same, containing a description in the words of the said Prentiss
White himself of his "improvement in the machine for making
ship thimbles"

Be it known that I Prentiss White of Yarmouth
in the County of Barnstable and State of Massachusetts, Black-
smith, have invented a new and useful improvement in
the machinery for making ship thimbles, and that the following
is a full and exact description of the construction and operation
of the machine as invented or improved by me, viz —

It consists of a bench horned anvil, and hammer, or
swedge with appurtenances, —
1st. The bench in the machine constructed for my own use
which I consider as convenient as any size, though it may
be varied in any of its dimensions or height as the person
using may choose is made of hard wood plank. 3 feet long and
9¾ inches wide, and 2 inches thick, The end on which the an-
vil is placed, is supported by a solid block, of the diameter
of the width of the bench and top, and enlarging downward
about 2 ft. long. to which it is secured by two screw head bolts
which passing through the plank, near the sides and being
flattened below are secured to the block which is chipped
off for the purpose; by bolts, or screws, and the other end by two
legs like other benches — across the forward part, directly over
the block, and under the anvil, is a plate of iron, ¼ Inch thick
and 4 inches wide inlaid and screwed to prevent said screw bolts
and anvil from indenting the bench, Near the back part
is a post about 6 inches in diameter and about 18 inches high, having an open channel or groove at top 2/4 inches wide &
8 inches deep to receive one end of the handle of the hammer, The
anvils used by me are made of cast iron which I consider prefer
able to any other, by reason of their cheapness accuracy of shape,
& hardness by reason of which their shape is longest retained, though
it may be made of wrought iron or steel or other hard material,
which is not easily put out of shape by the blows of the hammer
or swedge, Before describing the anvil it may be well to pre
mise, that there are several sizes of thimbles, those most in use
and the only ones which I have had occasion to make, are
numbered from one to sixteen inclusive beginning with one inch
and increasing 1/4 inch in size to 4 3/4 inches; and in width or
serve with 1/2 inch and increasing by 8/32 inch to 1 27/32 inches
each anvil has two horns which are fitted to make and form
two sizes of thimbles; and therefore to make the sixteen sizes, I
use eight anvils, which in several respects as will be shown
hereafter, vary in size and proportion according to the size of
the thimbles to be made, —
The anvil may be described in four parts viz. the shank or foot
body, head, and horns
The shank is of the same form and dimensions in all, and in
those I use is 1 3/4 inches square at the top and 1 5/8 inches at the
at the lower ends and 3 3/4 inches long, and fitted accurately
to a socket made through the iron plate and plank into the
foot-block. The body of the anvil which is round at the
termination of the shank varies in diameter from 2 1/2 inches to
3 inches, to proportion its strength to the power required to form
the thimbles, the smaller sizes being flattened a little to-
wards the head, in front and rear, on account of the less
diameter of the head. The length from the foot to the head
or I may say from the bench, (when the anvil is set in its
socket) to the head is not the same in all on account of
the different diameters of the heads, but the distance or
height

1/1/1856 7855X height from the bench to the centre of the hollow of the horn on the upper side is the same, in all and that is 7 inches.

The head is cylindrical running transversly with the bench, and of equal length between the horns, in all viz: 3 inches, varying in diameter from 1 9/16 inches at the ratio of 9/32 inches to 5 1/2 inches. But it may here be further explained that each horn is adapted to a different size of thimble and that therefore before shaping, the horn the end intended for the smaller thimble is turned down to the proper size for that thimble, being for the smaller size 19/32 inches and all the horns thus prepared will vary in diameter 9/32 inches each to 5 1/2 inches —

The horns, of which, as I have said there are two on each anvil one projecting from each end of the head, are adapted to two different sizes of thimbles, can be described most intelligibly by describing the manner of making the block or pattern, from which the castings are made. But I will premise that on each side of the hollow or channel in the horn there is a slant which I call a flame of 45 degrees to facilitate the sliding or settling of the ring (which is wider than the thimble after it is hollowed and finished) into the channel, and the horizontal width of the flame in the smallest horn is 5/64 inch and is increased in each number by 1/64 inch making that of the largest No. 16. 5/16 inch on each side also, that the width of the thimble when completed, which I call the score, is in the smallest horn 1/2 inch and is increased by 3/32 inch, making the largest No 16 1 29/32 inches. The width of the flame next the [illegible] is guaged off, then the width of the score and then the outer flame, a channel is then turned out to the depth of the flame, drawing inwards at the angle of 45°. which circle drawn round the horn is in the smallest 1 7/8 inches and increasing by 1/8 inch to No 16. 4 27/8 inches which brings it to the width of the score, then the channel which forms the inner surface of the thimble, is turned out in a curve, just fitted to the desired shape of the inner surface and a section in those I have made forms a segment of a circle whose cord is the score, or line drawn across the thimble at the lower margin of the flam, and the height of whose arc in the smallest horn is 5/32 inch which is increased in each succeeding number by 3/64 inch, making the highest No. 16. 55/64 inch and the diameter of circle around the horn cutting the said arc in the centre at right angles, is in my smallest 17/16 inch increasing in each succeeding number 5/32 inch, making No. 16. 3 5/32 inches, The sides of the horn are then cut away, equally and perpendicularly till on the upper surface only a quarter of the last mentioned circle remains, the outer lower corner and the underside of the horn is then cut away not enough to make it too weak but only sufficient to admit the ring freely and give room for the pincers, (which hold and turn the ring) to move between it and the horn, — The Hammers which I use are of cast iron, which for cheapness and durability I consider preferable, to any other, yet they may be made of wrought iron steel, or iron steel faced, they are made with two faces each fitted to form two sizes of thimbles The faces are hollowed or curved inward toward the centre in the direction of the handle, and this hollow or curve is the segment of a circle whose diameter in the smallest size is 1/4 inch increasing in the larger sizes by 1/4 inch each, and the length of the cord of that segment in the smallest is 7/8 inch which is increased in the larger by 1/16 inch each —

The hammers are shaped like stone cutters tapering like a wedge each way from the centre, nearly to the arc, which forms the face whence it continues to the face of equal thickness, and that thickness in the smallest size is 3/8 inch, which which is increased in each ascending size by 1/64 inch, This curved face is rounded so as to be fitted to form the hollow of the thimble The length of the chord is the thickness of the face, and the height of the arc, in the smallest size is 3/32 Inch, which is increased in each succeeding size by 1/32 inch The width of the smallest hammer is two inches which is increased in each succeeding size by 1/8 inch, the length of the hammer is the same in all viz. 6 inches between the two faces, The hammers are firmly and immoveably secured to their handles by a screw which with its application I claim to be my own invention, and which I believe will be found of great utility and convenience in fastening all instruments which have a round handle - The one hand takes it in his pincers and puts it on the horn and with the other plays the hammers at the same time turning the ring, and the thimble is very soon most perfectly shaped. The operation may be varied and the same principle retained by substituting dies for the hammer and horn and by calling instead of the hand, horse, steam, or water, power. It may be noticed also that the proportions of the thimble and consequently of the hammers and anvils may be varied from those given, if the purchasers or makers choose though those given, are those most in use, and considered most convenient —

The improvement for which I claim a patent, as my invention is the adapting the convex and concave surface of the horns to the form of the inside of the thimbles, and the faces of the hammers to the outside of the thimbles; and the same adaptation of dies, if dies be used to the desired form of the thimbles and the manner of hanging and regulating the position and motion of the handles, and the tapering screw, and its application to secure an instrument into its handle, — Yarmouth June 6th 1836.

Witnesses
J.W. Timothy Reid
Charles B. H. Fessenden

Prentiss White

193

Drawings Made